(12) United States Patent
Falck-Schmidt

(10) Patent No.: US 11,624,199 B2
(45) Date of Patent: Apr. 11, 2023

(54) TELESCOPIC MAST

(71) Applicant: Falck-Schmidt ApS, Odense (DK)

(72) Inventor: Jan Falck-Schmidt, Odense (DK)

(73) Assignee: Falck-Schmidt ApS, Odense S (DE)

( * ) Notice: Subject to any disclaimer, the term of this patent is extended or adjusted under 35 U.S.C. 154(b) by 0 days.

(21) Appl. No.: 17/052,080

(22) PCT Filed: Apr. 30, 2019

(86) PCT No.: PCT/DK2019/050130
§ 371 (c)(1),
(2) Date: Oct. 30, 2020

(87) PCT Pub. No.: WO2019/210922
PCT Pub. Date: Nov. 7, 2019

(65) Prior Publication Data
US 2021/0095492 A1    Apr. 1, 2021

(51) Int. Cl.
*E04H 12/18* (2006.01)
*E04B 1/343* (2006.01)

(52) U.S. Cl.
CPC ....... *E04H 12/182* (2013.01); *E04B 1/34305* (2013.01); *E04H 12/18* (2013.01)

(58) Field of Classification Search
CPC ... E04H 12/18; E04H 12/182; E04B 1/34305; H01Q 1/10; H01Q 1/103; H01Q 1/32; H01Q 1/3275
See application file for complete search history.

(56) References Cited

U.S. PATENT DOCUMENTS

| | | | | |
|---|---|---|---|---|
| 6,491 A | * | 6/1849 | Cox | E04H 12/182 52/121 |
| 133,017 A | * | 11/1872 | Davis | E04H 12/182 52/121 |
| 326,336 A | * | 9/1885 | Sandberg et al. | B66C 23/36 212/264 |
| 2,795,303 A | * | 6/1957 | Muehlhause | E04H 12/182 52/121 |

(Continued)

FOREIGN PATENT DOCUMENTS

| | | |
|---|---|---|
| AU | 2006200251 A1 | 2/2007 |
| GB | 2497921 A | 7/2013 |

(Continued)

*Primary Examiner* — Jessie T Fonseca
(74) *Attorney, Agent, or Firm* — Dykema Gossett PLLC

(57) ABSTRACT

Aspects of the present disclosure are directed to a telescopic mast. In some embodiment, the telescopic mast includes at least two telescope members with parallel walls. One of the at least two telescopic members including at least two adjoining telescopic sections, with one of the at least two adjoining telescope sections being thinner than the others of the at least two adjoining telescope sections, so that a telescope section can be passed respectively into and out of a telescope section positioned round it in a telescope member. This telescope section positioned round it can be passed into and out of a further telescope section in a further telescope member. The telescopic mast further including elastic elements/actuators fitted between the adjacent telescopic sections, the elastic elements/actuators equalize and bear the dead weight and the useful load on the telescopic mast.

6 Claims, 4 Drawing Sheets

(56) References Cited

U.S. PATENT DOCUMENTS

| | | | | |
|---|---|---|---|---|
| 3,047,107 | A * | 7/1962 | Parmenter | E04H 12/182 52/121 |
| 3,248,831 | A * | 5/1966 | Jones | E04H 12/182 52/121 |
| 3,745,725 | A * | 7/1973 | Boucaud | E04B 1/34305 52/67 |
| 4,151,534 | A * | 4/1979 | Bond | H01Q 1/1235 343/883 |
| 4,176,360 | A * | 11/1979 | Leavy | H01Q 1/10 343/880 |
| 4,357,785 | A * | 11/1982 | Eklund | E04H 12/182 52/632 |
| 4,580,377 | A * | 4/1986 | Sundin | E04H 12/182 254/400 |
| 4,594,824 | A * | 6/1986 | Ziegler | F21V 21/22 248/654 |
| 4,600,980 | A * | 7/1986 | Dahlgren | E04H 12/182 362/385 |
| 4,785,309 | A * | 11/1988 | Gremillion | H01Q 1/1235 343/883 |
| 5,101,215 | A * | 3/1992 | Greaser, Jr. | E04H 12/182 343/883 |
| 5,615,855 | A * | 4/1997 | Marue | B60P 3/18 248/188.5 |
| 5,850,713 | A * | 12/1998 | Hojo | H01Q 1/1235 52/115 |
| 5,983,778 | A * | 11/1999 | Dawson | F15B 15/16 92/52 |
| 6,046,706 | A * | 4/2000 | Vargas | H01Q 1/1235 343/880 |
| 6,276,811 | B1 | 8/2001 | Yoshimori et al. | |
| RE37,559 | E * | 2/2002 | Marue | E04H 12/182 248/405 |
| 9,598,875 | B1 * | 3/2017 | Bateman | E04H 12/182 |
| 2008/0236060 | A1 * | 10/2008 | Battaglia | E04H 12/182 52/121 |
| 2010/0050557 | A1 * | 3/2010 | Falck-Schmidt | F16B 7/14 52/632 |
| 2013/0239490 | A1 | 9/2013 | Peng et al. | |
| 2014/0311057 | A1 | 10/2014 | Puetz et al. | |
| 2014/0318040 | A1 * | 10/2014 | Edwards | E04H 12/34 52/118 |
| 2016/0261019 | A1 * | 9/2016 | Garmong | H01Q 1/1235 |
| 2016/0301128 | A1 * | 10/2016 | Blackwelder | H01Q 1/32 |
| 2017/0259730 | A1 * | 9/2017 | Carroll | B60Q 1/245 |
| 2018/0135794 | A1 * | 5/2018 | Ghazanfari | E04H 12/182 |

FOREIGN PATENT DOCUMENTS

| | | | | |
|---|---|---|---|---|
| JP | 2003147995 | A | 5/2003 | |
| WO | 2008125110 | A2 | 10/2008 | |
| WO | WO-2010131065 | A1 * | 11/2010 | E04H 12/10 |
| WO | WO-2012058403 | A1 * | 5/2012 | E04H 12/185 |
| WO | 2017044733 | A1 | 3/2017 | |

\* cited by examiner

TELESCOPIC MAST

CROSS-REFERENCE TO RELATED APPLICATIONS

This application is a national stage filing based upon International PCT Application No. PCT/DK2019/050130, filed 30 Apr. 2019, which claims the benefit of priority to Denmark application No. PA 2018 00189, filed 1 May 2018.

FIELD OF THE INVENTION

The present invention relates to a telescopic mast with very low energy consumption and at the same time protection against a single fault causing collapse of the mast or uncontrollable telescoping. The mast is suitable for stationary and mobile use (mounted on vehicles, ships etc.) for elevating/lifting sensors, communications equipment, weapons systems etc.

DESCRIPTION OF KNOWN TECHNOLOGY

Masts (telescopic masts) are available in various designs.
The following known solutions may be mentioned:
US Patent US2014/0311057, U.S. Pat. No. 4,357,785 and UK patent GB 2497921—Mast driven by a rope/pulley (wire/rope drive) system for telescoping the mast in and out and holding it in a given position. The solution only has this system for raising the mast/telescoping it out, wherein high energy supply is required to overcome/lift the load and the dead weight as well as frictional forces from the inclination of the mast, action of the wind etc. Furthermore, breakage of the wire/pulley system will cause complete or partial collapse of the mast.

The present invention differs markedly in low energy level and in that the mast cannot collapse if there is a fault of the mast's drive system.

Int. Patent WO 2008/125110 AA2. Mast with drive system where telescoping-out of the mast takes place by means of lifting elements (actuators) between the individual mast sections, which will be able to lift the total weight and overcome friction from the inclination, wind load etc. The mast is retracted with a wire/pulley system. This mast will require the mast's actuators—specifically pneumatic springs, to be greatly overdimensioned in proportion to the load to be lifted as in addition there will be frictional forces, losses of lifting capacity at low temperatures etc. The mast's wire pulley systems will act as a brake on the mast when telescoping out and holding it in a given position and overcoming the force from the overdimensioned lifting elements during retraction, which leads to high energy consumption. The mast's (wire/pulley) drive system is always under load unless the mast is lowered completely. The largest load is on this when the mast is retracted and under maximum load unless a locking mechanism is provided.

In case of breakage of the mast's wire/pulley system (single fault) the mast will/may telescope-out uncontrollably to the full length.

The present invention differs markedly in low energy level and in that the mast cannot collapse or telescope-out uncontrollably if there is a fault in the mast's drive system.

US patent US 2013/0239490 A1. Suspended mast with high precision and internal guide rails and sliding blocks and stops so that mast sections cannot fall out of one another. The manner in which the mast telescopes is not described.

The present invention differs markedly in low energy level and in that the mast cannot collapse or telescope-out uncontrollably if there is a fault in the mast's drive system.

BACKGROUND OF THE INVENTION

There are many forms of telescopic masts, some of which can be extended automatically. In connection with these telescopic masts, for example for military use, there is the particular requirement of usability and operability in extreme situations and weather conditions.

Furthermore, there are the following requirements:
low energy consumption
large loading capacity
high telescoping speed
possibility of manual telescoping
the order of telescoping of the sections should be controllable, e.g. the next largest mast section should telescope out before the others and in as the last
start/stop (mast locked) in all positions,
a design that can secure against rotation of the masts/mast sections about the longitudinal axis (azimuth rotation)
a design that offers the possibility of internal cable routing in the mast up to the useful load on the mast
that the mast cannot collapse under single-fault conditions that may result in personal injury and/or damage to equipment mounted on the mast and
large loading capacity.

Telescopic masts may be very high and may be used for sensors and weapons as well as for locating targets. High telescopic masts contain many telescope sections. With the above requirements for speed and low energy consumption, it will be advisable to equalize the weight of the load on the mast and of the individual mast sections.

There are masts with pneumatic, hydraulic, electric and manual drive, and for these it may be said that the power that has to be supplied for extending or retracting the telescopic mast is a result of mast loads, dead weight, friction etc., and the power consumption for high speed in both directions may be large and the time for manual operation may be very long, as a person can only exert limited power.

It is advisable that the component parts of the telescopic mast should not be heavier and larger in extent than strictly necessary. To be able to meet the requirement for reliability and robust construction it is clearly a disadvantage for a telescopic mast if the technology comprises weak technical solutions, wherein faults may occur, meaning that the telescopic mast cannot be operated rapidly, precisely and in all conditions.

Telescopic masts that are used in environments with large loads are exposed to static and dynamic loads. These may for example be caused by wind loads, as well as dynamic loads that arise in mobile use.

These loads may be very large G-loads that arise suddenly. They occur with any magnitudes and directions and produce a very complex loading pattern on the structure.

These loads may arise from the top where the useful load for example is mounted and/or from the bottom of the telescopic mast, in the case of a mobile base/platform.

The mast telescope system may/will correspondingly be exposed to very large loads.

Therefore, in connection with high telescopic masts it is most advantageous if they are constructed from simple components, which regardless of the conditions give simple and uncomplicated use and operation of the telescopic mast, and which minimize maintenance and ensure that the mast can give high telescoping speeds in both directions combined with positive control of mast length and at low power consumption, or with manual operation.

AIM OF THE INVENTION

The aim of the present invention is to provide a telescopic mast, with high capacity (load and mobility), wherein the power consumption is minimized and the mast does not collapse uncontrollably in case of breakage of the mast's drive system.

DESCRIPTION OF THE INVENTION

As mentioned at the outset, the invention relates to a telescopic mast comprising at least one or more telescope members with parallel walls, where one of two adjoining telescope sections is thinner than the other of the two adjoining telescope sections, so that a telescope section can be passed respectively into and out of a telescope section positioned round it in a telescope member, as well as so that it can be passed into and out of a further telescope section in a further telescope member.

The telescopic mast is distinctive in that
  Elastic elements/lift actuators are fitted between the individual mast sections, inside the mast, if the lifting capacity is adjusted so that these equalize/bear the weight of the sum of the useful load and of the sections of the mast that are above the elastic element/lift actuators wherein they are in weight/gravitational balance. Hence, the mast drive system alone will overcome frictional forces between the individual mast sections during mast extension or retraction.
  The mast cannot/will not collapse or telescope uncontrollably if there is a fault of the drive/lifting system as the load and dead weight of the mast components are equalized at the elastic elements/lift actuators.
  The mast's drive system is provided with a lifting belt/wire that is concealed between the sections and can thereby provide positive lift as well as retraction and hold/lock the mast in any position. These may be doubled for reasons of safety and reliability. They may also be fastened between mast sections so these are lifted simultaneously or with a long belt/wire so they are not lifted simultaneously.
  Slides/guide rails are fitted between the mast tubes with low friction and minimizing rotation of sections between the mast sections about the longitudinal axis of the mast. These may be fitted only at the bottom of the mast tubes adjusted with a length that does not exceed the overlap between the mast sections when masts are fully extended but may also be supplemented with slides/guide rails internally at the top of the individual mast sections. This reduces the weight and technical complexity of the mast.
  The mast sections may be made as polygonal tubes, and secured against rotation between the tubes about the longitudinal axis of the mast.

With a telescopic mast according to the invention, a secure mast may thus be obtained with little power consumption even at high speed, whether the drive mechanism is driven manually, hydraulically, pneumatically or electrically.

Thus, a single fault of an elastic element/actuator or drive cannot lead to total collapse of the mast or uncontrollable telescoping-out.

This design gives the further advantage that the large dynamic forces, shock effects and G-forces thus will also not be taken up by the drive system to the same extent as in other designs, as the elastic elements equalize the base weight of the structure and the load, and at the same time can damp dynamic effects.

According to a further embodiment, the telescopic mast according to the invention is distinctive in that the belts/wires for moving the sections of the telescopic mast are fitted in such a way that they run inside the mast.

According to a further embodiment, the telescopic mast according to the invention is distinctive in that for example the elastic element or elements that support the first telescope section may be dimensioned for larger load than the dead weight, which will cause the first mast section to move before the others sections of the mast.

In practice, it has proved to be most appropriate for the mast to be made of polygonal tubes, wherein the guide rail or guide rails in each telescope member may be omitted. None of the known solutions meets these requirements.

DESCRIPTION OF THE DRAWING

The invention is described in more detail referring to the drawing, where.

DETAILED DESCRIPTION OF THE INVENTION

Figure 1:
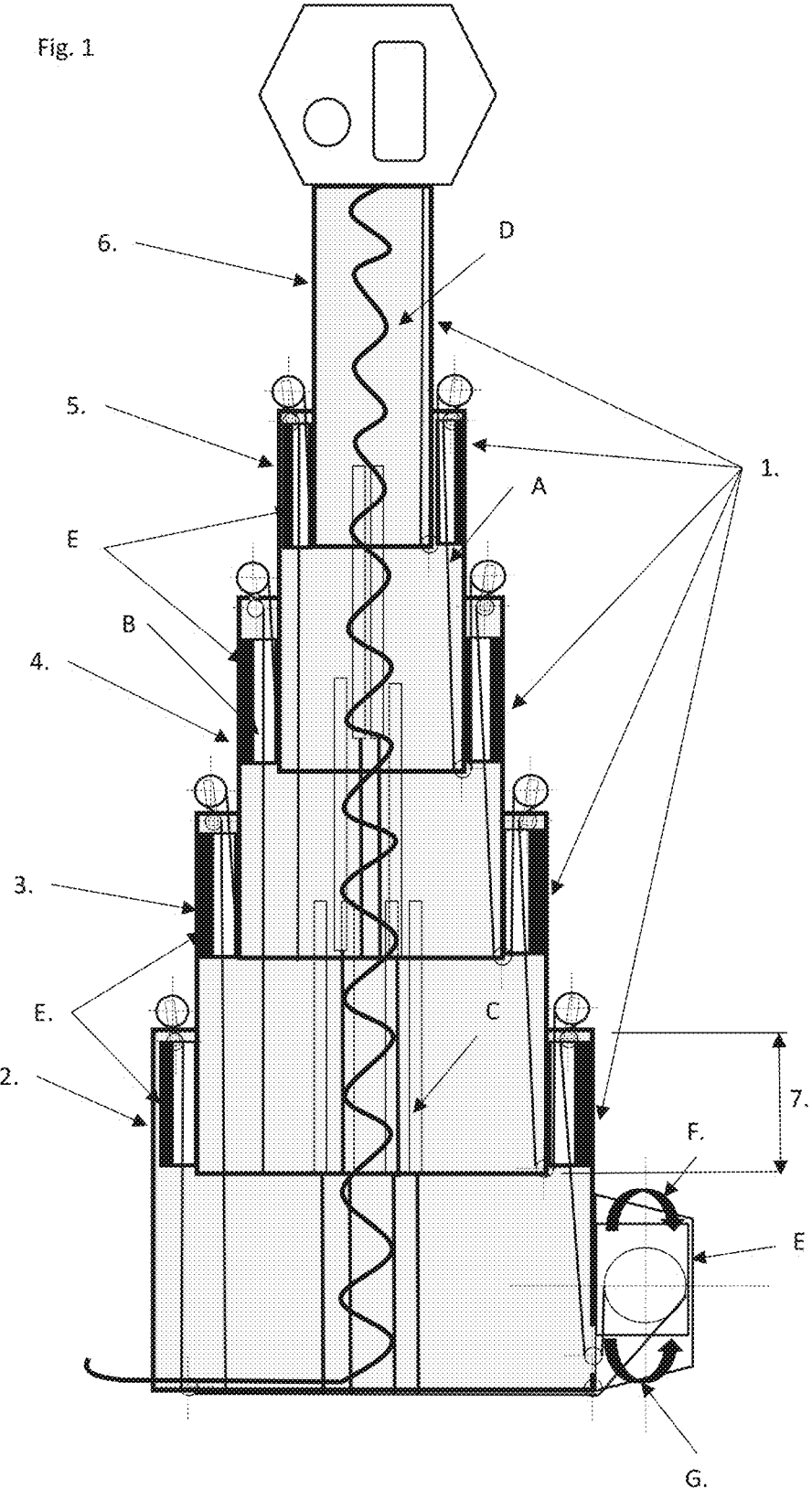
FIG. 1 shows a section through the longitudinal axis of a telescopic mast, in the telescoped-out state according to the invention, showing
    belt or wire for extension (A) or retraction (B),
    spring elements/actuators (C) for equalizing/bearing the dead weight/the load of the mast components and the useful load on the mast
    internal cable routing (D) in the mast up to the useful load (I)
    drive mechanism (H) (hydraulic, electric, manual and/or pneumatic)
    a mast with 5 mast sections
Figure 2:
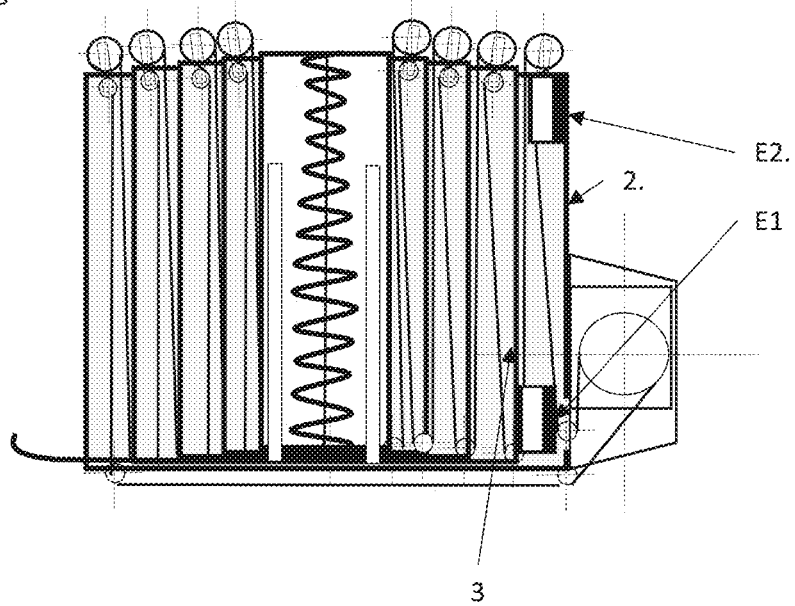
FIG. 2 shows a section through the longitudinal axis of a telescopic mast, in the retracted state according to the invention
    in this example the slides/guide rails (E) are supplemented with slides/guide rails
    (E1) at the top of the mast tubes.
Figure 3:
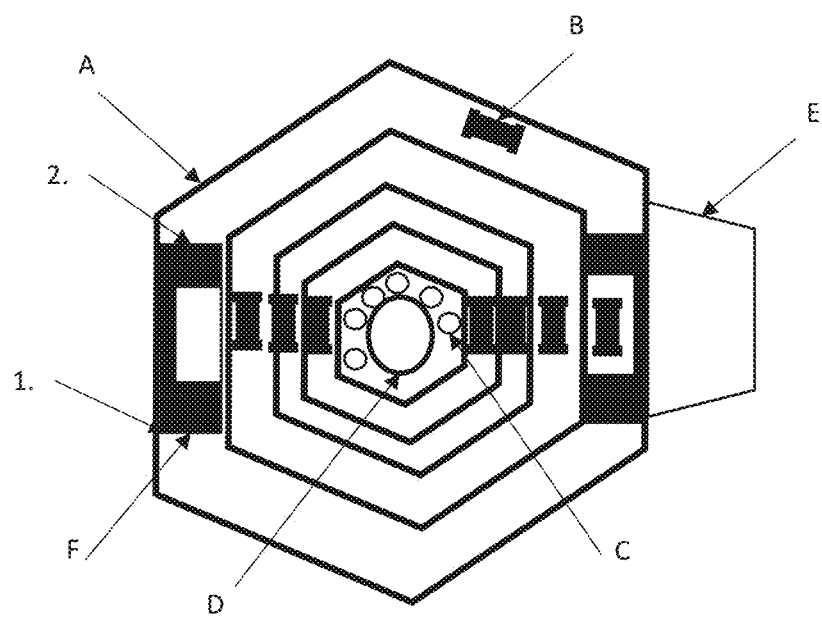
FIG. 3 shows a cross-section through a telescopic mast, showing
    in this example, a mast with hexagonal mast sections/tubes (A)
    pulleys (B) for belts or wires for extension (A) or retraction
    spring elements/actuators (C) for equalizing/bearing the dead weight/the load of the mast components and the useful load on the mast
    internal cable routing (D) in the mast up to the useful load
    drive mechanism (H) (hydraulic, electric, manual and/or pneumatic)
    a mast with 5 mast sections (A)
    slides/guide rails (E) are fitted between the mast tubes

FIGS. 1-3 show various sectional views of the same structure.

FIG. 1 shows a telescopic mast with five sections 1, showing a section through a single telescope member 2. The telescope member 2 comprises a first telescope section 3, a second telescope section 4, a third telescope section 5 and a fourth telescope section 6. Second telescope section 4 is of smaller dimension than the first telescope section 3, so that the second telescope section 4 can be inserted over the first telescope section. It is possible to provide several telescope sections round the telescope member shown, or a further telescope section, which is positioned inside the telescope member 2 shown.

In the embodiment shown, the telescope sections are provided with a polygonal cross-section e.g. hexagonal (FIG. 3) or orthogonal etc. Alternatively, the telescope sections may be provided with other shapes of cross-section, for example circular.

Straps or wires for extending the mast A, or for retracting the mast B, are fitted in the gap between the sections. These may be a long wire or strap, whereby sections of the mast are moved arbitrarily when the drive H rotates. When, as illustrated, the rotation is clockwise F, the mast is extended, and when the rotation is anticlockwise G the mast is retracted. These wires/straps may also be fastened on sections so that all sections move simultaneously. Using a combination of the above two methods for moving the mast, some sections can be controlled while others move arbitrarily. For example, it is possible to have section 3 always run out first and in last.

Furthermore, elastic elements/actuators C are fitted that support the individual sections, and by dimensioning them so that they equalize the load (the dead weight) of sections and load etc. above the elastic element this will equalize said load/weight and the drive system will thus only overcome friction in the mast system during movement of the telescopic mast. As a result, the mast can be moved with a much reduced energy consumption as it will not be lifting the loads.

FIG. 2 shows the mast in the retracted state, also showing an example of divided guide rails/slides E. The lowest E1 is fitted lowest and externally on the internal telescope section 3 and slides internally over the external telescope section 2. The upper guide rail/slide is fitted internally at the top of the external telescope section 2 and slides externally over the internal telescope section 3.

As can be seen from FIG. 3, guide rails/slides E are fitted. The guide rail/slide E is mounted at the bottom externally, e.g. on the telescopic tube 3 supported on the inside of the telescopic tube 2 and with a length that does not exceed the length of the overlap between the two mast sections illustrated 7.

The guide rails/slides E may be divided into two (viewed along the longitudinal axis of the mast) with one mounted as described above and the other mounted at the top of the external mast section 2 in the above example but so that the total length of the two guide rails/slides does not exceed the overlap 7 of the sections.

By fitting a number of guide rails/slides (2 or more) round polygonal mast sections, the mast is at the same time secured against rotation between the individual sections (azimuth) viewed along the longitudinal axis of the mast.

An example is also shown of pulleys B for wires/straps A/B for the mast telescope drive H optionally with a recess in guide rails/slides E for this, alternatively guide rails/slides E or wires/straps A/B are fitted on each of their surfaces on a polygonal mast section.

Figure 4:
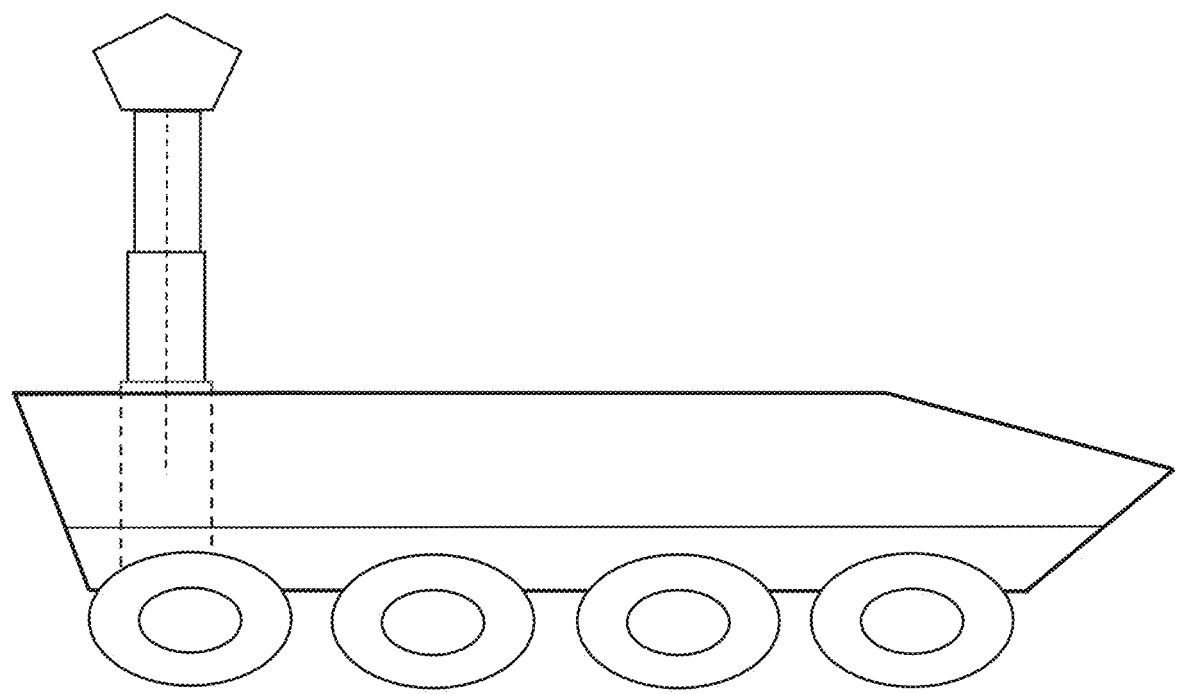
FIG. 4 shows a schematic drawing of a telescopic mast with 3 mast sections mounted on a vehicle.

FIG. 4 shows an example of a mast fitted in/on an armoured vehicle.

Here, the telescopic mast is shown mounted on a wheeled vehicle, but it may alternatively be a track-laying vehicle. A useful load is mounted at the top of the mast. This useful load may for example be antenna equipment, observation equipment, lamps, weapons or other equipment.

The invention claimed is:

1. Telescopic mast comprising:
   a number of telescopic members with parallel walls, each of the telescopic members including
   at least two adjoining telescopic sections, one of the at least two adjoining telescopic sections is thinner than another of the at least two adjoining telescopic sections, wherein the one of the at least two adjoining telescopic sections is configured and arranged to be passed respectively into and out of the another of the at least two telescopic sections positioned around the one of the at least two adjoining telescopic sections, and so that it can be passed into and out of a further telescopic section in another telescopic member of the number of telescopic members; and
   elastic elements or actuators fitted along a longitudinal axis of the telescopic mast between adjacent telescopic sections of the at least two adjoining telescopic sections, the elastic elements or actuators configured and arranged to equalize and bear the dead weight of the telescopic mast and a load on the telescopic mast; and
   straps or wires configured and arranged for extending or retracting the telescopic mast and fitted in a space between individual telescopic sections of the at least two adjoining telescopic sections.

2. The telescopic mast according to claim 1, characterized in that the elastic elements or actuators are configured and arranged to form a cavity extending through the longitudinal axis of the telescopic mast.

3. The telescopic mast according to claim 1, further including one or more guide rails or slides are provided for each of the telescopic members, the one or more guide rails or slides are distributed along a circumference of each of the telescopic members,
   whereby the telescopic mast is configured and arranged to be secured against rotation occurring between the at least two adjoining telescopic sections about the longitudinal axis of the mast.

4. The telescopic mast of claim 1, wherein a cross-section of the at least two adjoining telescopic sections are a polygonal shape, round shape, or oval shape.

5. The telescopic mast of claim 1, wherein the straps or wires are running over pulleys or guides, and the straps or wires are configured and arranged to be driven electrically, pneumatically, hydraulically and/or manually.

6. The telescopic mast of claim 2, wherein the cavity is configured and arranged to contain an internal cable extending to and communicatively coupled with the load at a distal end of the telescopic mast.

* * * * *

UNITED STATES PATENT AND TRADEMARK OFFICE
CERTIFICATE OF CORRECTION

| | | |
|---|---|---|
| PATENT NO. | : 11,624,199 B2 | Page 1 of 1 |
| APPLICATION NO. | : 17/052080 | |
| DATED | : April 11, 2023 | |
| INVENTOR(S) | : Jan Falck-Schmidt | |

It is certified that error appears in the above-identified patent and that said Letters Patent is hereby corrected as shown below:

On the Title Page

Item (73), the assignee section should read, in its entirety, as follows:
(73) Assignee: Falck-Schmidt ApS, Odense S (DK)

Signed and Sealed this
Third Day of December, 2024

Katherine Kelly Vidal
*Director of the United States Patent and Trademark Office*